United States Patent [19]

Hagen et al.

[11] Patent Number: 4,813,705
[45] Date of Patent: Mar. 21, 1989

[54] SPRING SYSTEM FOR VEHICLES, ESPECIALLY MOTOR VEHICLES

[75] Inventors: Hans Hagen, Munich; Rudolf Mueller, Dachau, both of Fed. Rep. of Germany

[73] Assignee: Bayerische Motoren Werke AG, Munich, Fed. Rep. of Germany

[21] Appl. No.: 118,050

[22] Filed: Nov. 9, 1987

[30] Foreign Application Priority Data

Nov. 7, 1986 [DE] Fed. Rep. of Germany ....... 3637984

[51] Int. Cl.$^4$ ............................................ B60G 17/02
[52] U.S. Cl. .................................................. 280/707
[58] Field of Search ................... 280/707, DIG. 1, 6 R

[56] References Cited

U.S. PATENT DOCUMENTS

| 3,124,368 | 3/1964 | Corley et al. ......................... 280/6 R |
| 4,690,429 | 9/1987 | Asami et al. ......................... 280/707 |

FOREIGN PATENT DOCUMENTS

| 2738455 | 3/1979 | Fed. Rep. of Germany . |
| 3308011 | 9/1984 | Fed. Rep. of Germany . |
| 3424979 | 1/1986 | Fed. Rep. of Germany . |
| 3434757 | 4/1986 | Fed. Rep. of Germany . |
| 192178 | 8/1986 | Fed. Rep. of Germany . |

OTHER PUBLICATIONS

Darenberg, Gall & Acker, "Chancen und Probleme aktiver Kraftfahrzeugfederungen," VDI-Berichte hr.515, 1984, pp. 187-194.

Furhmann, "Aktive Federung für Morgen?", CH-Zeitung Automobil Revue hr.46/1983 of Nov. 10, 1983, p. 45.

Fuhrmann "Das denkende Fahrwerk," DE-Zeitschrift Mot, Heft 4/1984, pp. 46-48.

*Primary Examiner*—Kenneth R. Rice
*Attorney, Agent, or Firm*—Barnes & Thornburg

[57] ABSTRACT

In a vehicle spring system, the rear wheel spring system is constructed as active spring system and the front wheel spring system as passive spring system. The control pulses for the active rear wheel spring system are supplied from the vehicle front wheels which act as road surface sensors.

4 Claims, 1 Drawing Sheet

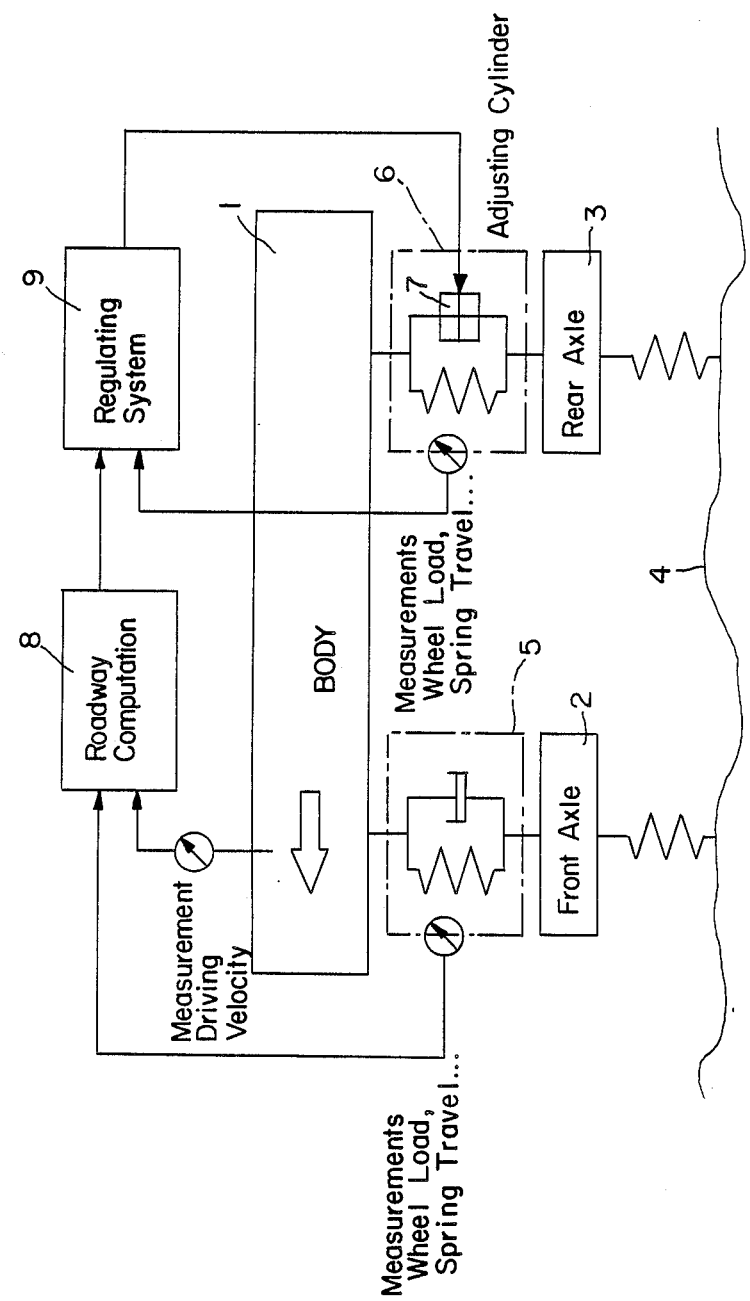

ical vehicles, which is arranged between the vehicle wheels and the body, and in which the rear wheel spring system is constructed as active spring system and the vehicle front wheels are constructed as road surface sensors and are operatively connected with the active rear wheel spring system.

SPRING SYSTEM FOR VEHICLES, ESPECIALLY MOTOR VEHICLES

BACKGROUND AND SUMMARY OF THE INVENTION

The present invention relates to a spring system for vehicles, especially for motor vehicles, which is arranged between the vehicle wheels and the body, and in which the rear wheel spring system is constructed as active spring system and the vehicle front wheels are constructed as road surface sensors and are operatively connected with the active rear wheel spring system.

Active vehicle spring systems, by means of which the driving safety, on the one hand, and the driving comfort, on the other, are to be increased, are known (DE-OS No. 27 38 455, DE-OS No. 33 08 011. DE-OS No. 34 24 979, DE-OS No. 34 34 757, U.S. Pat. No. 3,124,368; Darenberg, Gall and Acker, "Chancen und Probleme aktiver Kraftfahrzeugfederungen", VDI-Berichte Nr. 515, 1984, Pages 187-194; Fuhrmann, "Aktive Federung für morgen?", CH-Zeitung Automobil Revue Nr. 46/1983 of Nov. 10, 1983, Page 45). Furthermore, it is known to utilize the deflections, which a vehicle front wheel undergoes as a result of road surface unevennesses and which thus supply information about the road profile, as control magnitudes for the active spring system (EP-OS No. 192 178; Fuhrmann, "Das denkende Fahrwerk", DE-Zeitschrift Mot, Heft 4/1984, Pages 46-48). With the known active vehicle spring systems, an active spring system is always provided both at the vehicle front wheels as also at the vehicle rear wheels. This requires a considerable expenditure.

The present invention is concerned with the task to far-reachingly achieve the advantages, which are connected with an active vehicle spring system, with relatively slight expenditure.

The underlying problems are solved according to the present invention in that that front wheel spring system is constructed as passive spring system while the rear wheel spring system remains constructed as active spring system.

According to the present invention, the sensing signals thus act on an active spring system provided exclusively at the vehicle rear wheels, whereas a passive spring system is provided at the vehicle front wheels.

An optimization is achieved by the present invention which represents a compromise between the conflicting requirements, on the one hand, to keep the expenditure as low as possible and, on the other, to utilize as fully as possible the potential possibilities of an active vehicle spring system.

According to the present invention, a sufficient time interval is available for the activation of the rear wheel spring system. For example, with a wheel base of 2.5 m and a driving velocity of 90 km/h, the spacing with respect to time between the time when the vehicle front wheels drive over a predetermined road location and the vehicle rear wheels pass over the same, amounts to 0.1 s. The available time between the signal detection at the vehicle front wheels and the adjustment of the vehicle rear wheels which takes place after the signal processing, makes it possible to actuate the active spring system with an acceptable power expenditure. Only the usual expenditure for a passive spring system is thereby required for the spring system at the vehicle front wheels.

BRIEF DESCRIPTION OF THE DRAWING

These and other objects, features and advantages of the present invention will become more apparent from the following description when taken in connection with the accompanying drawing which shows, for purposes of illustration only, one embodiment in accordance with the present invention, and wherein:

The single FIGURE is a schematic view of one embodiment in accordance with the present invention.

DETAILED DESCRIPTION OF THE DRAWING

Referring now to the single FIGURE of the drawing, the body 1 of a motor vehicle, not illustrated in detail, which may be a passenger motor vehicle as also a commercial vehicle and whose forward driving direction is indicated by an arrow, is supported on a road surface 4 by way of a front axle 2 having vehicle front wheels and by way of a rear axle 3 having vehicle rear wheels. A passive spring-damping arrangement 5 is arranged for each of the vehicle front wheels between the front axle 2 and the body 1 in a customary manner. An active spring arrangement 6 with adjusting cylinder 7 is provided between the rear axle 3 and the body 1 for each of the vehicle rear wheels.

The data required for the control of the active spring arrangement 6 are detected in a known manner by means of sensors. The measured values determined in the front area of the vehicle are fed to a computer 8, to which are additionally fed signals about the driving velocity. On the basis of the input signals fed thereto, the computer 8 calculates the contour of the road surface 4. A signal corresponding to the road contour is transmitted from the computer 8 as guide magnitude to a regulating system 9 which adjusts the distance between the body 1 and the rear axle 3. The vehicle rear wheels which, during a forward drive, follow the vehicle front wheels at a distance determined by the vehicle construction, are thus continuously adjusted in their height position corresponding to the road profile determined by the vehicle front wheels which act as road surface sensors. The body 1 thereby does not change its height position or only changes it insignificantly.

The control of the stroke movements of only the vehicle rear wheels offers with respect to an exclusively passive spring system a considerable gain and with respect to an active vehicle spring system provided at both the vehicle front wheels as also at the vehicle rear wheels, entails a loss in driving safety and driving comfort which is slight. The active spring system exclusiveLy at the vehicle rear wheels is advantageous because the rear axle is determinative to a particular degree for the driving safety (stability), the driving dynamics and the driving comfort. This is true as regards driving dynamics in particular for motor vehicles with a standard drive, i.e., with a vehicle engine arranged in front and a rear wheel drive.

The active spring system at the vehicle rear wheels can be utilized at the same time for the purpose of level regulation.

In the actual realization of the present invention, adjustable shock absorbers with a damping force selectively adjustable between limits may be utilized with the passive spring-damping arrangements at the vehicle front wheels. These shock absorbers can be controlled for quasi-stationary conditions by the active spring system at the rear axle, for example, in such a manner that the adjustment of the shock absorbers takes place correctly in phase.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A spring system for vehicles, especially motor vehicles, which is arranged between vehicle wheels and a body means, comprising a rear wheel spring system contructed exclusively as an active spring system means for adjusting the distance between the rear wheels and the body, a front wheel spring system constructed exclusively as a passive spring system means for adjusting the spring effect of the front wheels, and the vehicle front wheels being contructed as road sensor means and are operatively connected with the active rear wheel spring system means by way of regulating means to effect an adjustment of the height between the rear wheels and the body within a period of time it takes for the rear wheels to attain the position of the front wheels when the front wheel sensor sensed a need for height adjustment.

2. A spring system according to claim 1, further comprising adjustable shock absorber means coordinated to the passive spring system means of the front wheels, said adjustable shock absorber means being selectively adjustable within given limits.

3. A spring system according to claim 2, further comprising control means for controlling the shock absorber means from the active spring system means of the rear wheels in response to height changes between the rear wheels and the body.

4. A spring system according to claim 3, wherein for a quasi-stationary condition said control means adjusts the shock absorber means in correct phase relationship.

* * * * *